United States Patent [19]

Kwan

[11] 4,411,932
[45] Oct. 25, 1983

[54] METHOD FOR THE PREVENTION OF SOILANT DEPOSITS ON CONTACT LENSES

[75] Inventor: Stephen C. Kwan, Arlington, Tex.

[73] Assignee: Alcon Laboratories, Inc., Fort Worth, Tex.

[21] Appl. No.: 324,273

[22] Filed: Nov. 23, 1981

[51] Int. Cl.³ .................. G02B 1/10; B08B 17/02; B05D 1/18
[52] U.S. Cl. .................. 427/164; 427/430.1
[58] Field of Search .................. 427/164, 430.1

[56] References Cited

U.S. PATENT DOCUMENTS 4,143,949 3/1979 Chen .................. 427/164 X
4,168,112 9/1979 Ellis et al. .................. 427/164 X

OTHER PUBLICATIONS

Moore et al., "Novel Temperature-Dependent Model for Examining Soilant Deposition Deterrent Action. I. Preserved Thermal Disinfecting Solutions", Contacto 24(3), 23, 1980.

Primary Examiner—James R. Hoffman
Attorney, Agent, or Firm—Fitch, Even, Tabin & Flannery

[57] ABSTRACT

This invention relates to polymeric alcohols and polymeric ethers including poly(ethylene glycol), polyethylene oxide and polyethylene glycol methyl ether as prophylactic agents against soilant deposits on contact lenses.

7 Claims, No Drawings

METHOD FOR THE PREVENTION OF SOILANT DEPOSITS ON CONTACT LENSES

This invention relates to the prevention of soil deposits on soft contact lenses. More particularly, this invention relates to poly(ethylene glycol) and polyethylene glycol alkyl ethers as prophylactic agents against soilant deposits on soft contact lenses.

Efficient cleaning of soft contact lenses without damaging them when they become encrusted with foreign matter sometimes presents difficult cleaning problems. Contact lenses have a propensity to develop soil deposits including proteinaceous encrustations, lipids or other materials such as lady's mascara which usually is a soap or wax in gelatin. Success in wearing and properly using contact lenses is a function of maintaining them in a clean condition without the buildup of foreign matter, particularly matter which encrusts lenses by physically or chemically attaching to them.

Buildup of soil on a contact lens is gradual, but will eventually render the lens opaque. Further, even before reaching opacity, encrustation of the lens may cause discomfort and irritation to the wearer.

Hard contact lenses may be buffed to remove encrustation buildup. Soft contact lenses, however, are particularly prone to encrustation buildup, and present difficult cleaning problems because of their general physical characteristics including their soft surface. Soft contact lenses may be disinfected by chemical treatment or boiling, but neither treatment is entirely successful in removing encrustations. Some chemicals may not remove proteins, others may not remove lipids. Boiling may even denature proteinaceous material on a contact lens and attach the encrustations more firmly to the lens.

In view of the difficulty in removing soil encrustations from soft contact lenses, it would be advantageous to substantially preclude the buildup of soil encrustations on soft contact lenses. A need exists, therefore, for a composition and method which can substantially prevent the deposition of such encrustations on contact lenses upon their daily wear.

In accordance with the present invention, the use of aqueous solutions of poly(ethylene glycol) (hereinafter "PEG"), polyethylene oxide (hereinafter "PEO") also known as polyoxyethylene, and polyethylene glycol alkyl ethers having a molecular weight in the range between about 500 to about 5,000,000 at concentrations in excess of about 0.05% by weight/volume substantially prevent the accumulation of soil buildup including protein encrustations on soft contact lenses. Poly(ethylene glycol) which has the formula $H(OCH_2CH_2)_nOH$, having a molecular weight in the range of from about 500 to about 15,000 at a concentration of about 0.1% to about 5.0% weight/volume; polyethylene oxide which has the formula $O(-CH_2CH_2O-)_nH$, having a molecular weight in the range of about 100,000 to about 5,000,000, at a concentration of about 2.5% by weight/volume to about 0.25% by weight/volume; and polyethylene glycol methyl ether (hereinafter "PEGME") having a molecular weight in the range from about 550 to about 5,000 at a concentration of about 0.05% by weight/volume to about 5% by weight/volume preferably may be used in conjunction with preservative, disinfecting, or cleaning contact lens solutions to prevent the buildup of soil and encrustations on soft contact lenses.

To provide a solution which will act as a prophylactic against soil deposits on soft contact lenses, the PEG having a molecular weight in the range of about 500 to about 15,000, PEG alkyl ether having a molecular weight in the range from about 550 to about 5,000, or PEO having a molecular weight in the range of about 100,000 to about 5,000,000 is mixed with the aqueous contact lens solution such that the concentration of the PEG is in excess of about 0.1% by weight/volume, the concentration of the PEG alkyl ether is in excess of about 0.05% by weight/volume, or the concentration of the PEO is in excess of about 0.1% by weight/volume.

The following examples are provided to illustrate the invention more fully; however, they should not construed as limiting the scope of the invention, many variations of which are contemplated.

To test the abilities of PEG and PEGME to prevent the buildup of soil encrustations on soft contact lenses, the following aqueous solutions were mixed for testing. Distilled water was used as control for the tests.

The following aqueous solutions of PEG and PEGME, having a molecular weight as shown, were made by mixing the PEG PEGME, and sodium chloride into solution with distilled water with the percentages being weight/volume.

|  | % NaCl |
|---|---|
| % PEG (molecular weight 3,350) |  |
| 0.1 | 0.9 |
| 0.5 | 0.9 |
| 1.0 | 0.9 |
| 1.0 | — |
| 5.0 | 0.9 |
| 5.0 | — |
| % PEG (molecular weight 6,800) |  |
| 0.1 | 0.9 |
| 0.5 | 0.9 |
| 1.0 | 0.9 |
| 1.0 | — |
| 5.0 | — |
| % PEG (molecular weight 8,000) |  |
| 1.0 | — |
| 5.0 | — |
| % PEO (molecular weight 14,000) |  |
| 5.0 | — |
| % PEG (molecular weight 100,000) |  |
| 2.5 | — |
| % PEO (molecular weight 600,000) |  |
| 2.5 | — |
| % PEO (molecular weight 5,000,000) |  |
| .25 | — |
| % PEGME (molecular weight 550) |  |
| 5.0% | — |
| % PEGME (molecular weight 5,000) |  |
| 5.0% | — |

Those solutions with 0.9% by weight/volume NaCl will hereinafter be referred to as normal saline or NS solutions.

Tresoft soft hydrophilic contact lenses which are products of Alcon Laboratories, Inc. were subjected to encrustation with a Model I deposition solution containing 0.05% by weight Grade I hen egg white lysozyme 3X crystallized protein, 0.05% by weight porcine stomach mucin type II, and 0.09% by weight NaCl to pH 7.0. The lenses were subjected to encrustation by immersing them into 5 ml of the model solution in a stoppered glass vial, heating the contents to 90° C. for one hour, and cooling the lenses.

The solutions containing PEG and PEGME were evaluated for their prophylactic properties with respect to lens encrustation by heating a clean Tresoft lens in the respective solution to be tested at 85° to 95° C. for one hour and cooling. Each lens was cleaned with normal saline, and checked and evaluated for haziness. Thereafter, each lens was subjected to a deposition cycle by exposure to the model solution as previously described. After each deposition cycle the lenses were visually examined and classified according to the Rudko scale. Some of the lenses were subjected to as many as five deposition cycles. The results of the tests are shown in Table I below.

In the Table, the deposits on the lenses generally were classified according to the Rudko system. Heaviness of deposits were classified as:
I. clean;
II. deposits are visible under oblique light when wet using 7X magnification;
III. deposits when dry are visible to unaided eye without special light; and
IV. deposits when wet are visible to unaided eye.

The extent of deposits were classified as:
A. 0–25% of lens surface contained deposits;
B. 25–50% of lens surface contained deposits;
C. 50–75% of lens surface contained deposits; and
D. 75–100% of lens surface contained deposits.

Hazing and encrustations were further classifed as follows:
+—better than 99% clean
*—better than 95% clean
a—better than 90% clean
H—hazy
SH—slightly hazy
VSH—very slightly hazy
VVSH—very very slightly hazy
CL—clear lens
NS—normal saline
DW—distilled water

TABLE I

PROPHYLACTIC PROPERTIES OF PEG AND PEGME

| AGENT | CONC (%) weight/volume | LENS AFTER 1st Htg | DEPOSITION CYCLES |||||
|---|---|---|---|---|---|---|---|
| | | | 1 | 2 | 3 | 4 | 5 |
| PEG 3,350 (LOT #1) | 0.1 (NS) | CL | I | I | I | IIIA | |
| | 0.1 (NS) | CL | IIA | IIIA | IIIA | IIIA | |
| | 0.5 (NS) | CL | I | I | I | IIIA | |
| | 0.5 (NS) | CL | IIa | IIa | I | I | |
| | 1.0 (NS) | CL | IIa | I | IIa | IIa | |
| | 1.0 (NS) | VSH | I | I | I | IIIA | |
| | 1.0 (DW) | H | I | I | I | I | |
| | 1.0 (DW) | H | I | I | I | I | |
| | 5.0 (DW) | H | I | I | I | IIa | |
| | 5.0 (DW) | H | I | I | I | I | |
| | 5.0 (NS) | VVSH | I | I | IIa | IIIa | |
| | 5.0 (NS) | H | I | IIa | IIA | IIa | |
| PEG 3,350 (LOT #2) | 0.1 (NS) | CL | I | I | I | I | |
| | 0.1 (NS) | CL | IIIA | IIIA | IIIA | IIIA | |
| | 0.5 (NS) | H | I | I | I | I | |
| | 0.5 (NS) | H | I | I | I | I | |
| | 5.0 (DW) | H | I | IIa | I | I | I |
| | 5.0 (DW) | H | IIa | IIIA | IIA | IIIA | IIIA |
| | 1.0 (DW) | H | I | I | I | I | IIA |
| | 1.0 (DW) | H | I | IIA | IIA | IIIA | IIIA |
| | 1.0 (NS) | H | I | I | I | I | |
| | 1.0 (NS) | H | I | I | I | IIa | |
| PEG 6,800 | 0.1 (NS) | VVSH | I | I | I | IIIa | |
| | 0.1 (NS) | VSH | I | I | IIa | IIa | |
| | 0.5 (NS) | SH | I | IIa | IIIa | IIIA | |
| | 0.5 (NS) | H | I | IIa | II | IIIA | |
| | 1.0 (NS) | H | I | I | IIIa | IIIa | |
| | 1.0 (NS) | H | I(H) | I(H) | I(SH) | I | |
| | 1.0 (DW) | H | I | IIa | IIa | IIa | IIa |
| | 1.0 (DW) | H | I | IIa | IIa | IIa | IIA |
| | 5.0 (DW) | H | I | IIa | IIa | IIIa | IIA |
| | 5.0 (DW) | H | I | I | I | I | IIa |
| PEG 8,000 | 1.0 (DW) | H | IIA | IIa | IIa | IIIA | IIIA |
| | 1.0 (DW) | H | IIA | IIa | IIa | IIIa | IIIB |
| | 5.0 (DW) | H | I | I | I | IIa | IIa |
| | 5.0 (DW) | H | I | IIa | IIa | IIa | IIa |

| AGENT | CONC (%) | LENS AFTER 1st Htng | PROTEIN DEPOSITION CYCLES |||||
|---|---|---|---|---|---|---|---|
| | | | 1 | 2 | 3 | 4 | 5 |
| CONTROLS | — | CL | IIA | IIIA | IIIA | IIIA | |
| | — | CL | I | IIA | IIA | IIIA | |
| | — | CL | IIA | IIIA | IIIA | IIIA | |
| | — | CL | IIIA | IIIA | IIIA | IIIA | |
| | — | CL | IIIA | IIIA | IIIA | IIIA | |
| | — | CL | I | IIIA | IIIA | IIa* | |
| | — | CL | IIIA | IIIB | IIIB | IIIB | |
| | — | CL | I | IIa* | IIa* | IIa* | |
| | — | CL | I | I | IIa* | IIIA | |
| | — | CL | IIIA | IIIB | IIIB | IIIB | |
| | — | CL | IIA | IIA | IIIA | IIIA | |
| | — | CL | IIA | I | IIIA | IIIA | |
| PEG 3,350 (LOT #2) | 1 (DW) | SH | I | IIa | IIa | IIA | |
| | 1 (DW) | SH | IIa | IIA | IIA | IIa | |

TABLE I-continued
PROPHYLACTIC PROPERTIES OF PEG AND PEGME

|  | 1 (DW) | SH | I | I | IIA | IIA |
|---|---|---|---|---|---|---|
|  | 5 (DW) | H | I | I | IIA | IIA |
|  | 5 (DW) | H | I | I | IIa | IIa |
|  | 5 (DW) | H | I | I | IIa | IIa |
| PEG 6,800 | 5 (DW) | H | IIa+ | IIa+ | IIIA | — |
|  | 5 (DW) | H | IIa+ | IIa+ | IIa+ | — |
| PEG 14,000 | 5 (DW) | H | I(H) | I(H) | I(SH) |  |
|  | 5 (DW) | H | I(H) | I(H) | I(SH) |  |
| PEO 100,000 | 2.5 (DW) | H | I(SH) | I(SH) | IIa*(SH) |  |
|  | 2.5 (DW) | H | I(SH) | IIC(SH) | IID(SH) |  |
| PEO 600,000 | 2.5 (DW) | H | I(SH) | IIA(SH) | IIB(SH) |  |
|  | 2.5 (DW) | H | IIB(SH) | IIIB(SH) | IIIC(SH) |  |
| PEO 5,000,000 | .25 (DW) | H | IIa(SH) | IIa(SH) | IIa(SH) |  |
|  | .25 (DW) | H | IIA(SH) | IIIA(SH) | IIIA(SH) |  |
| PEGME 550 | 5 (DW) | CL | I | I | I |  |
|  | 5 (DW) | CL | I | I | I |  |
| PEGME 5,000 | 5 (DW) | CL | I | I | IIIa+ |  |
|  | 5 (DW) | CL | I | I | IIa+ |  |
| CONTROLS | — | CL | IIa | IIA | IIA |  |
|  | — | CL | IID | IIID | IVD |  |
|  | — | CL | IIa | IIIA | IIIB |  |
|  | — | CL | IIC | IIIC | IIID |  |

The data indicates that PEGs and PEOs with a molecular weight preferably in the range from about 3350 to about 600,000 and PEGME with a molecular weight in the range from about 550 to about 5,000 are efficacious in preventing Model I solution from depositing on soft contact lenses.

In anothr test, the efficacy of aqueous solutions of PEG, PEGME and PEO to prevent the encrustation of soft contact lenses were evaluated. In the test, normal saline solution (0.9% NaCl by weight/volume) was used as a control. The PEG, PEGME, and PEO, the percentages being on a weight/volume basis, to be tested were dissolved in normal saline solution. Before undergoing the deposition cycles, except for the control lenses, the lenses were heated in the respective solution of PEG, PEGME, and PEO for one hour at 85° to 95° C. and allowed to cool overnight. After cooling the lenses were cleaned with normal saline solution and checked for cleanliness prior to being subjected to the protein model deposition cycle. Each lens was subjected to a deposition cycle in Model I solution at 90° C. for one hour. After each deposition cycle, each lens was classified according to Rudko scale. Table II shows the results of the tests.

TABLE II
PROPHYLACTIC PROPERTIES OF PEG, PEGME AND PEO

| LENS # | AGENT | % CONC | Cyc 1 | Cyc 2 | Cyc 3 |
|---|---|---|---|---|---|
| 1 | PEG 6,800 | 5 | IIa+ | IIa+ | IIIA |
| 2 | PEG 6,800 | 5 | IIa+ | IIa+ | IIa+ |
| 3 | PEG 14,000 | 5 | I(H) | I(H) | I(SH) |
| 4 | PEG 14,000 | 5 | I(H) | I(H) | I(SH) |
| 5 | PEGME 550 | 5 | I | I | I |
| 6 | PEGME 5,000 | 5 | I | I | IIa+ |
| 7 | PEGME 550 | 5 | I | I | I |
| 8 | PEGME 5,000 | 5 | I | I | IIa+ |
| 9 | PEO 100,000 | 2.5 | I(SH) | I(SH) | IIa+(SH) |
| 10 | PEO 100,000 | 2.5 | I(SH) | IIC(SH) | IID(SH) |
| 11 | PEO 600,000 | 2.5 | I(SH) | IIA(SH) | IIB(SH) |
| 12 | PEO 600,000 | 2.5 | IIB(SH) | IIIB(SH) | IIIC(SH) |
| 13 | PEO 5,000,000 | 0.25 | IIa(SH) | IIa(SH) | IIa(SH) |
| 14 | PEO 5,000,000 | 0.25 | IIA(SH) | IIIA(SH) | IIIA(SH) |
| 15 | CONTROL | — | IIa | IIA | IIA |
| 16 | CONTROL | — | IID | IIID | IVD |
| 17 | CONTROL | — | IIa | IIIA | IIIB |
| 18 | CONTROL | — | IIC | IIIC | IIID |

In another test, at the indicated percentage by weight/volume, PEG was dissolved in a commercial thermal disinfecting solution, Boil-n-Soak manufactured by Burton Parsons & Co. of Washington, D.C.; and the efficacy of the PEGs in a commercial solution to prevent soil encrustation on soft contact lenses was tested. Boil-n-Soak is a sterile buffered isotonic aqueous solution containing boric acid, sodium borate, 0.7% by weight/volume, 0.001% by weight/volume thimerosal, and 0.1% by weight/volume edetate disodium. In the test, a Boil-n-Soak without PEG was used as a control; and the solutions containing PEGs were compared to Permasol, another thermal disinfecting solution, which is a product of Cooper Vision, Inc. The lenses were boiled in their respective solution to be tested for one hour at 90° C. Thereafter, each lens was subjected to a deposition cycle in Model I solution by heating the lens in the solution for one hour at 90° C. After each deposition cycle each lens was evaluated according to Rudko scale for deposits thereon, and the results are shown in Table III.

TABLE III
PEG WITH BOIL-n-SOAK

| | CYCLES | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| PEG 3,350 (0.5%) | I | I | I | I | I | IIA | IIIB | IVB | IVB | IVC | | |
| PEG 3,350 (0.3%) | I | IIB | IIC | IID | IIIA | IIIB | IIIC | IVA | IVB | IVC | | |

TABLE III-continued

| | PEG WITH BOIL-n-SOAK CYCLES | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| PEG 3,350 (0.1%) | I | IIC | IIC | IID | IIIB | IIID | IIID | IVB | IVB | IVC | | |
| PEG 6,800 (0.5%) | I | IIA | IIA | IIB | IIIA | IIIA | IIIB | IVB | IVB | IVC | | |
| PEG 6,800 (0.3%) | I | IIA | IIA | IIB | IIIA | IIIA | IVB | IVD | IVD | IVD | | |
| PEG 6,800 (0.1%) | IIC | IID | IID | IIIA | IIIA | IIIB | IIIB | IVD | IVD | IVD | | |
| PERMASOL | I | I | I | I | I | IIA | IIA | IIA | IIC | IID | IID | IID |
| BOIL n' SOAK (CONTROL) | IIA | IID | IIIA | IIIA | IIIA | IIIB | IVA | IVD | IVD | IVD | IVD | IVD |

It should be understood that while certain preferred embodiments of the present invention have been illustrated and described, various modifications thereof will become apparent to those skilled in the art. Accordingly, the scope of the present invention should be defined by the appended claims and equivalents thereof.

Various features of the invention are set forth in the following claims.

What is claimed is:

1. A method for preventing soil encrustation on a soft contact lens comprising exposing the soft contact lens to an aqueous solution which comprises a composition selected from the group consisting of poly(ethylene glycol) having a molecular weight in the range from about 500 to about 15,000, alkyl ethers of polyethylene glycol having a molecular weight in the range from about 550 to about 5,000, polyethylene oxide having a molecular weight in the range from about 100,000 to about 5,000,000, and mixtures thereof.

2. A method as recited in claim 1 wherein said poly(ethylene glycol) has a molecular weight in the range of from about 3,350 to about 15,000 and said polyethylene oxide has a molecular weight in the range from about 100,000 to about 600,000.

3. A method as recited in claim 1 wherein exposing said soft contact lens includes heating said lens in said solution.

4. A method as recited in claims 1, 2, or 3 wherein said solution has a concentration of said composition in the range of from about 0.1 to about 5.0 percent by weight/volume.

5. A method as recited in claim 3 wherein said composition is poly(ethylene glycol) having a molecular weight in the range from about 500 to about 15,000, and said polyethylene glycol has a concentration in said solution in the range from about 0.1 percent to about 5.0 percent by weight/volume.

6. A method as recited in claim 3 wherein said composition is polyethylene glycol methyl ether having a molecular weight in the range from about 550 to about 5,000, and said polyethylene glycol methyl ether has a concentration in said solution in the range from about 0.05% to about 5 percent weight/volume.

7. A method as recited in claim 3 wherein said heating is in the range of from about 85° C. to about 95° C.

* * * * *